(12) United States Patent
Coble

(10) Patent No.: US 8,352,339 B2
(45) Date of Patent: Jan. 8, 2013

(54) BANKRUPTCY RELIEF CALCULATOR

(75) Inventor: Patrick C. Coble, Greensboro, NC (US)

(73) Assignee: Bank of America Corporation, Charlotte, NC (US)

( * ) Notice: Subject to any disclaimer, the term of this patent is extended or adjusted under 35 U.S.C. 154(b) by 1938 days.

(21) Appl. No.: 10/904,682

(22) Filed: Nov. 23, 2004

(65) Prior Publication Data

US 2006/0111992 A1    May 25, 2006

(51) Int. Cl.
*G06Q 40/00* (2012.01)
(52) U.S. Cl. .......................................................... 705/35
(58) Field of Classification Search ................ 705/1, 35, 705/38, 39; 715/503, 504, 538; 707/609
See application file for complete search history.

(56) References Cited

U.S. PATENT DOCUMENTS

| | | | | |
|---|---|---|---|---|
| 3,863,060 A | * | 1/1975 | Rode et al. | 708/134 |
| 5,701,499 A | * | 12/1997 | Capson et al. | 715/212 |
| 7,272,783 B2 | * | 9/2007 | Bauchot et al. | 715/213 |
| 7,668,863 B2 | * | 2/2010 | Kalmick et al. | 705/5 |
| 2001/0039523 A1 | * | 11/2001 | Iwamoto | 705/35 |
| 2003/0120587 A1 | * | 6/2003 | Hargrave et al. | 705/38 |
| 2004/0064404 A1 | * | 4/2004 | Cohen et al. | 705/38 |
| 2004/0177029 A1 | * | 9/2004 | Hammour et al. | 705/38 |

OTHER PUBLICATIONS

Hoffman, Melvin S. and Cymrot, Jeffrey J.; "Disaffirming reaffirmation"; Commercial Law Journal; v 105n1; Spring 2000; pp. 1-19.*
Cross, Angela; "A guide to bankruptcy and collections software for attorneys and agencies"; Commercial Law Bulletin, v15,n5; Sep./Oct. 2000; pp. 1-21.*

* cited by examiner

*Primary Examiner* — Ella Colbert
(74) *Attorney, Agent, or Firm* — Michael A. Springs; Moore & Van Allen, PLLC; W. Kevin Ransom

(57) ABSTRACT

Bankruptcy relief calculator. A calculation program can make a relatively objective determination as to whether to file for relief from a bankruptcy stay relative to a particular account and associated collateral. Using historical statistics on bankruptcy filings as well as information about the collateral and depreciation of the collateral, the calculator can make an estimate of depreciation saved by the filing and compare that estimate to the cost of a filing. The calculator can then produce a recommendation as to whether to file for relief or to wait for the bankruptcy to be discharged in its normal course. The invention can be implemented via a stand-alone computing system or such a system interconnected with other platforms or data stores by a network, such as a corporate intranet, a local area network, or the Internet.

22 Claims, 4 Drawing Sheets

FIG. 2

Average Time from Filing to Term for Chapter 7 No Assets
Filed 01/01/2003 through 12/31/2003 —— 211

| State | translation | Court | Average Time from Filing (in days) | Total Record Count | Standard Deviation | Max | Min |
|---|---|---|---|---|---|---|---|
| AK | Anchorage | AKMAANCH | 130 | 819 | 45.4927382785772207 | 456 | 53 |
| AK | Fairbanks | AKMAFAIR | 139 | 209 | 33.7556433348304467 | 292 | 80 |
| AK | Juneau | AKMAJUNE | 137 | 73 | 26.9926282286666803 | 236 | 109 |
| AK | Ketchikan | AKMAKETC | 132 | 58 | 30.4906886305302008 | 322 | 107 |
| AK | Nome | AKMANOME | 168 | 6 | 75.4418098050853277 | 297 | 106 |
| AL | Anniston | ALNOANNI | 117 | 2,326 | 28.9226879260202902 | 389 | 34 |
| AL | Birmingham | ALNOBIRM | 127 | 5,211 | 40.3934561461711182 | 486 | 15 |
| AL | Decatur | ALNODECA | 117 | 3,315 | 35.3218816776629129 | 449 | 6 |
| AL | Mobile | ALSOMOBI | 123 | 2,815 | 40.7834589884482771 | 483 | 16 |
| AL | Montgomery | ALMIMONT | 125 | 4,148 | 45.6629333892808045 | 507 | 0 |
| AL | Tuscalossa | ALNOTUSC | 118 | 1,003 | 42.4878085963505977 | 437 | 72 |
| AR | Fayetteville | ARWEFAYE | 118 | 5,689 | 35.8716704117590277 | 455 | 0 |
| AR | Little Rock | AREALITT | 119 | 8,112 | 32.6801002162270823 | 469 | 0 |
| AZ | Phoenix | AZMAPHOE | 165 | 14,357 | 55.3398066629095956 | 467 | 8 |
| AZ | Tucson | AZMATUCS | 157 | 4,268 | 43.0874159979920366 | 480 | 39 |
| AZ | Yuma | AZMAYUMA | 153 | 1,284 | 40.6966680937593644 | 437 | 35 |
| CA | Fresno | CAEAFRES | 107 | 8,576 | 14.2243876304590344 | 369 | 41 |
| CA | LA, San Fernando | CACELASF | 118 | 8,617 | 20.9178393055254944 | 462 | 1 |
| CA | Los Angeles | CACELOSA | 124 | 27,368 | 25.2196467877213244 | 499 | 3 |

↑ 202   ↑ 204   ↑ 206   ↑ 208   ↑ 210   ↑ 212   ↑ 214   ↑ 216

↗ 200

BANKRUPTCY RELIEF CALCULATOR

BACKGROUND OF INVENTION

Filing bankruptcy, at least in the United States, automatically stays (stops) most actions by creditors against the debtor or the debtor's property. For example, the stay prevents a secured creditor from foreclosing or repossessing the collateral for the loan. The stay is designed to preserve the debtor's property and to give the debtor a break from litigation. The stay is neither absolute nor permanent. A creditor can file for "relief" from the bankruptcy stay and will be allowed to seek a remedy against the debtor in spite of the stay if the creditor can show good cause to do so.

Once the bankruptcy proceeding reaches its end and the debtor is "discharged" a creditor can proceed to repossess collateral or foreclose in order to protect its interest. However, the bankruptcy cycle time can be many months. For some types of property, especially personal property such as automobiles, the depreciation of the value of the property during the bankruptcy proceeding results in additional loss to the creditor. Thus, one reason a creditor might be granted relief from the bankruptcy stay is that its interest in the collateral is not adequately protected because the collateral is depreciating due to the passage of time and the debtor's use of the collateral, while all the while the debtor is making no payments to the creditor.

Financial institutions with large numbers of outstanding loans must continuously review accounts for debtors in bankruptcy and make determinations as to whether there is enough at stake to justify the cost of filing for relief from the bankruptcy stay. This review is often a largely manual process.

SUMMARY OF INVENTION

The present invention, as disclosed in example embodiments, provides a calculator that can make a relatively objective determination as to whether to file for relief from a bankruptcy stay relative to a particular account and associated collateral. Using historical statistics on bankruptcy filings as well as information about the collateral and depreciation of the collateral, the calculator can make an estimate of depreciation saved by the filing and compare that estimate to the cost of a filing to produce a recommendation as to whether to file for relief in a particular bankruptcy court, as opposed to waiting for discharge In at least some embodiments the calculator generates a filing recommendation for obtaining relief from bankruptcy for a specific account with associated collateral by first determining a cycle time for discharge of the bankruptcy. This cycle time can be estimated in various ways. In example embodiments, it is a lower control limit time that represents the outside time for discharge. The calculator then estimates an amount of depreciation saved based at least in part on a depreciation rate for the collateral, the cycle time, and a predicted time for obtaining relief from the bankruptcy. The calculator can then compare the amount of depreciation saved to a cost for obtaining relief to produce the filing recommendation for the account.

In some embodiments, the cycle time used is the outside discharge time that is obtained based on historical average discharge times and a standard deviation of discharge times for a specified court. These statistics can be said to be in the form of a data set and can be obtained from a spreadsheet listing, a local database, or a remote database that is accessed over the network.

In some embodiments, the amount of depreciation saved is estimated by calculating a depreciation rate for the collateral, estimating the relevant number of days of depreciation based on the predicted time for obtaining relief from bankruptcy, a current date, and a filing date for the bankruptcy. The estimated amount of depreciation saved by filing for relief is then compared to the cost of filing for relief in order to produce the filing recommendation. In some embodiments, it is possible to automatically generate filing forms and/or papers to initial the filing when the recommendation is positive.

In some embodiments, the invention is implemented via either a stand-alone instruction execution platform or such a platform interconnected with other platforms or data stores by a network, such as a corporate intranet, a local area network, or the Internet. A computer program product or computer program products contain computer programs with various instructions to cause the hardware to carry out, at least in part, the methods and processes of the invention. Data sets including bankruptcy court statistics and/or forms can be stored locally or accessed over the network and can take the form of spreadsheets or databases. In some embodiments, a user input screen is operable to receive appropriate input for controlling the calculations.

BRIEF DESCRIPTION OF DRAWINGS

FIG. 2 is a portion of a data set that can be used to provide bankruptcy court statistics to the bankruptcy relief calculator in example embodiments.

DETAILED DESCRIPTION

The present invention will now be described in terms of specific, example embodiments. It is to be understood that the invention is not limited to the example embodiments disclosed. It should also be understood that not every feature of the systems and methods described is necessary to implement the invention as claimed in any particular one of the appended claims. Various elements, steps, processes, and features of various embodiments of systems, apparatus, and processes are described in order to fully enable the invention. It should also be understood that throughout this disclosure, where a process or method is shown or described, the steps of the method may be performed in any order or simultaneously, unless it is clear from the context that one step depends on another being performed first. Also, time lags between steps can vary.

Figure 1:
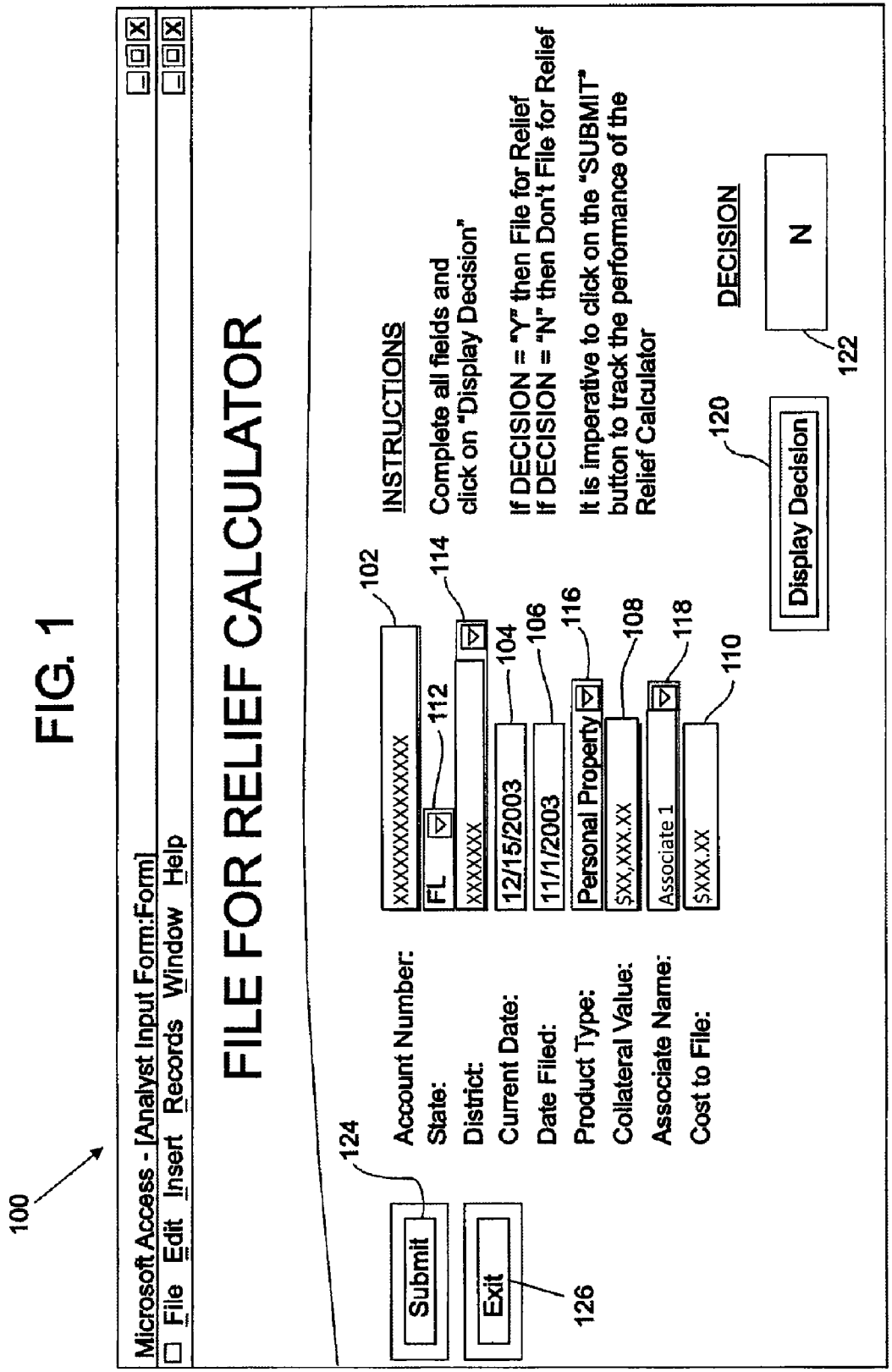
FIG. 1 is an example screen shot of a user screen for the bankruptcy relief calculator. In this particular example, the calculator is implemented in Microsoft Access™.

FIG. 1 is a screen shot of a user screen, 100, for the bankruptcy relief calculator according to example embodiments of the invention. In this particular example, the calculator is implemented using the functionality of Microsoft Access, and a local data set is stored in the form of an Access database with statistical court information and any other needed data. Instructions are provided on the screen. A user can populate field 102 with an account number, in this example, "XXXXXXXXXXX". Field 104 in this example embodiment is automatically populated with the current date. The user can populate field 106 with the relevant date. Alternatively, a system could be designed so that any of these fields are automatically populated from the database or the system. The system in such a case could be devised to allow some or all of the automatic values to be overridden by the user, depending on design preference. In field 108, the user enters the current, estimated value of the collateral for the loan account in issue. This could also be pulled from a database or data set. The calculator could be designed in this case so that the user can override the value automatically pulled in. Finally, field 110 is populated with the cost to file for relief as determined based on the particular state and district in which the bankruptcy was filed. This cost in this example embodiment is populated from data stored in the system, and cannot be changed. Again, a system could be designed so that this cost is entered manually, or a default could be pulled from a database or stored data set, with the calculator program allowing the default value to be overridden by the user.

In the particular example of FIG. 1, fields 112, 114, 116, and 118 are so called "drop-down" box fields, where a user picks one of several possibilities from a list. It can be assumed for purposes of this example that the calculator is being used in the United States. Thus, box 112 is for the state or territory where the bankruptcy relative to the account entered is pending. In this example, the selection of a specific state in box 112, in this example Florida as exemplified by the abbreviation "FL," limits the selection of court designations that can be selected in box 114. In this particular example, the designation "FLMITAMP" is being used to indicate the Bankruptcy Court in the Middle District of Tampa, Fla.

In box 116, the user selects the type of collateral. For example, categories such as "Personal Property," "Real Property," "Automobile," and "Recreational Vehicle" might be possibilities. This selection may trigger the use of a certain daily fractional multiplier in calculating a depreciation rate, as depreciation rates will vary with different types of property. This calculation will be discussed further below with respect to FIG. 3. Finally, in box 118, the user selects their name from a list of potential users. In this example, all the potential users are employees which are referred to by the particular bank or lending institution as "Associates" and the one selected is named "Laura Smith." Box 118 could alternatively be set up as a type-in field.

Once all the boxes and fields in user screen 100 have been appropriately populated, the user presses button 120, labeled "Display Decision" and a recommendation is produced based on the data entered and acquired from the data set or database. As is typical with modern, graphical operating systems, button 120 is "pressed" by clicking it with the mouse. A result is then displayed in box 122. In this example embodiment, a "Y" represents a "yes" decision, which is a decision to file for relief from the bankruptcy stay for this particular account. An "N" is displayed to represent a no decision. An "E" can also be displayed in some embodiments to notify a user that an error has been encountered. In example embodiments, particular messages could be displayed next to boxes or fields where the data entered there is the source of the error, so that a user has some idea of how to correct the problem. The exact implementation of an error checking and notification routine can vary, but the creation of such a routine is well within the capabilities of a person of ordinary skill in the art, thus, the details of an error handling routine will not be discussed further herein.

In the particular example of FIG. 1, two other buttons are present. Button 124, labeled "Submit," is used to submit a record of this run of the calculator to a database. Such records can optionally be used by system administrators or similar persons to monitor usage statistics, errors, and the like. Button 126 is an Exit button that ends the calculator program and returns the user to the operating system desktop screen, or possibly some higher-level application screen.

FIG. 2 illustrates a portion, 200, of a data set that can be used to supply bankruptcy court statistics to a bankruptcy relief calculator according to example embodiments of the invention. The data is organized in the typical fashion, where each district court's data is on a line, and the various types of information is organized in columns. Column 202 gives the state abbreviation. Column 204 lists the name of the bankruptcy court district, thus it is referred to as the "translation" of the designation listed in column 206. Column 208 lists the average time from filing to discharge in each court. Column 210 lists the total number of bankruptcy records for the court during the time period 211 listed near the top of the drawing. Column 212 gives the standard deviation for the time from filing to discharge for all the cases relative to the average shown in column 208. Columns 214 and 216 give the maximum and minimum times from filing to discharge for any one case during the time period for each court. It should be noted that in this example embodiment, some of the data listed in the data set may be there for informational purposes, and is not necessarily used in the calculations described below. Additional data can also be provided for record keeping or study purposes.

One of ordinary skill in the art can readily determine the best way to assemble the statistical data needed for a particular embodiment of the bankruptcy relief calculator. For example, the data shown in FIG. 2 can be supplied in the form of a spreadsheet data file and automatically loaded in the Access database at regular intervals; whenever it is determined the data should be updated for accuracy. For example, these updates could be carried out monthly, quarterly, or yearly. Any of various information gathering or "mining" firms can be contracted to gather statistical data on bankruptcies and supply the needed data in the appropriate data set format. For example, a data set like that shown in FIG. 2 can be assembled and prepared for a fee by American InfoSource, of Oklahoma City, Okla., United States.

Figure 3:
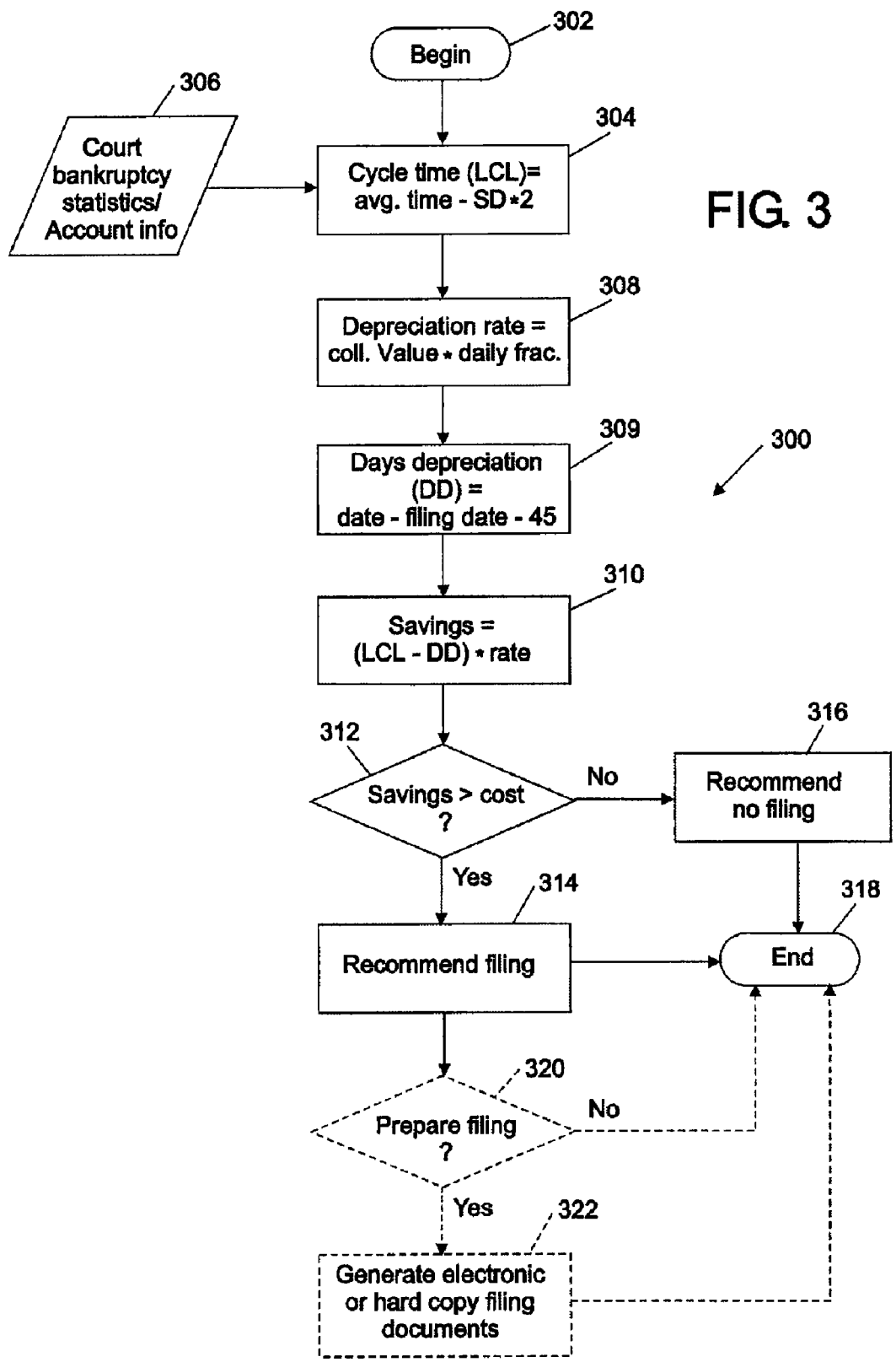
FIG. 3 is a flowchart that illustrates a method of performing calculations according to example embodiments of the invention.

FIG. 3 illustrates the calculation method of an example embodiment of the bankruptcy calculator. FIG. 3 illustrates process 300 in flowchart form, that is, as a series of process blocks. The process begins at block 302, which in example embodiments is where a user clicks the "Display Decision" button. At block 304, a cycle time for discharge of the bankruptcy is calculated. In at least some embodiments, this is done using information on the account, such as the type of collateral and location of the bankruptcy, and court statistics for the relevant bankruptcy court. This information, 306, is shown as an input at block 304 where cycle time is calculated, but can in fact be used at other points of the calculation process. In this example the cycle time used is a lower control limit (LCL). The LCL is calculated as follows.

$$LCL = \text{Average time (in days)} - (\text{standard deviation }(SD) * 2)$$

The average time is the average time from bankruptcy filing to discharge. The lower control limit value is used in order to determine the longest expected cycle time, in this example, a Chapter 7N bankruptcy in a specific bankruptcy court. This longest expected cycle time can also be referred to as an "outside discharge time" based on a historical average discharge time and its standard deviation. The upper control limit would indicate the shortest cycle time for the bankruptcy and is not considered in this example embodiment.

At block 308 of FIG. 3, a depreciation rate in dollars per day is calculated by multiplying the current collateral value by a number representing the fractional value of the collateral lost each day. Both of these numbers can be looked up in a database, or one or both can be supplied by a user. These numbers are readily available from various sources such as published insurance and tax statistics. In one example embodiment, a daily multiplier used for passenger automobiles is 0.000648.

At block 309 of FIG. 3, the number of days of depreciation (DD) to be used in the savings determination is calculated as follows.

$$DD = \text{current date} - \text{filing date} - 45$$

Note that 45 is subtracted from the number of days between the current date and the bankruptcy filing date in the equation above. The number 45 represents the average time to file and receive action on a petition for relief from bankruptcy for all bankruptcy courts in the United States. Thus, 45 in this example is a predicted time for obtaining relief from the bankruptcy stay. In this example embodiment, one number is used regardless of the court involved. However, the system could be set up so that a specific processing time for each court is used, and even the average time may vary, so that the number might change. Finally, at block 310 of FIG. 3, the saving realized by filing for relief from the stay is calculated by subtracting the days of depreciation from the LCL value, and multiplying the result by the depreciation rate.

At block 312 of FIG. 3, the savings realized by filing for relief as calculated above is compared to the cost of filing, which was previously discussed and is shown on the input screen of FIG. 1. If the savings is greater than the cost at block 312, a positive filing recommendation is returned and displayed at block 314. If not, a "no" decision, or negative filing recommendation is returned and displayed at block 316. In the latter case, the process ends at block 318. In the example detailed embodiment disclosed herein, the process can also end at block 318 after a filing recommendation is returned, with the exception of possibly submitting a record of the calculation to a database as discussed with respect to FIG. 1. This submission is not shown in FIG. 3. Optionally the user in some embodiments can be queried at block 320 as to whether there is a desire to prepare filing documents. If not, the process ends at block 318. If so, filing documents can be prepared at block 322 with some information from the data sets or databases populated on at least some of the requisite filing forms. Then the process ends at block 318. In some embodiments, block 318 will correspond to the user clicking the "Exit" button in FIG. 1.

Figure 4:
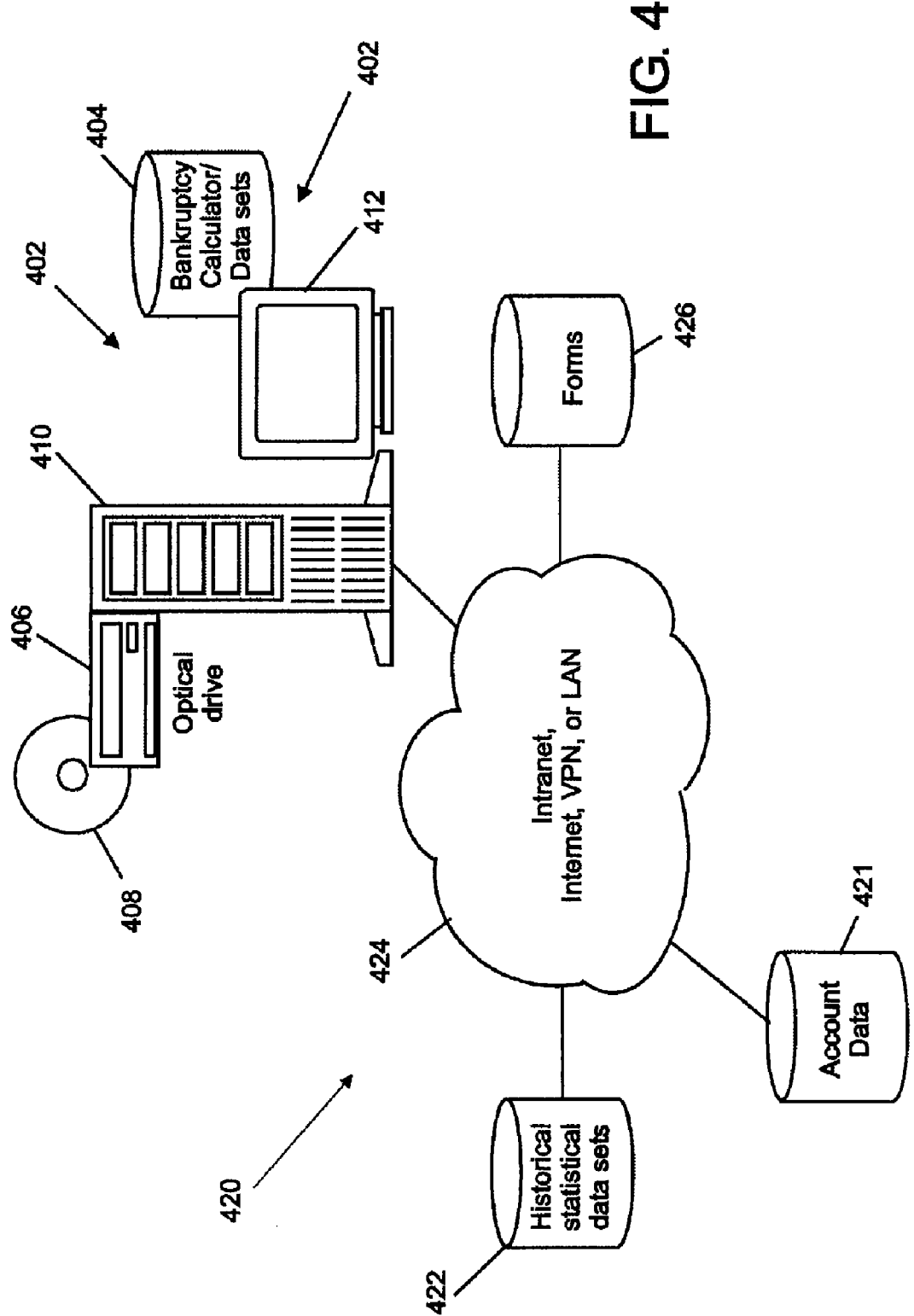
FIG. 4 is a system block diagram according to example embodiments of the invention.

FIG. 4 illustrates a typical operating environment for embodiments of the present invention. FIG. 4 actually illustrates two alternative embodiments of a system implementing the invention. System 402 can be a workstation or personal computer. System 402 can be operated in a "stand-alone" mode. The system includes a fixed storage medium, illustrated graphically at 404, for storing programs and/or macros which enable the use of an embodiment of the invention. In a stand-alone implementation of the invention, fixed storage 404 can also include the data sets, which are necessary to implement an embodiment of the invention. In this particular example, an optical drive, 406, is connected to the computing platform for loading the appropriate computer program product into system 402 from an optical disk, 408. The computer program product includes a computer program or programs with instructions or code for carrying out the methods of the invention. Instruction execution platform 410 of FIG. 4 can execute the appropriate instructions and display appropriate screens on display device 412. These screens can include the user input screen previously discussed. A4

FIG. 4 also illustrates another embodiment of the invention in which case the system 420 which is implementing the invention includes a connection to data stores, from which account data and/or bankruptcy statistics including historical data can be retrieved, as shown at 421 and 422, respectively. The connection to the data stores or appropriate databases can be formed in part by network 424, which can be an intranet, virtual private network (VPN) connection, local area network (LAN) connection, or any other type of network resources, including the Internet. Stored forms can be local, for example also on fixed storage 404, or stored on the network for example, in data store 426.

In any case, a computer program which implements all or parts of the invention through the use of systems like those illustrated in FIG. 4 can take the form of a computer program product residing on a computer usable or computer readable storage medium. Such a computer program can be an entire application to perform all of the tasks necessary to carry out the invention, or it can be a macro or plug-in which works with an existing general purpose application such as a spreadsheet or database program. Note that the "medium" may also be a stream of information being retrieved when a processing platform or execution system downloads the computer program instructions through the Internet or any other type of network. Computer program instructions which implement the invention can reside on or in any medium that can contain, store, communicate, propagate or transport the program for use by or in connection with any instruction execution system, apparatus, or device. Such a medium may be, for example, but is not limited to, an electronic, magnetic, optical, electromagnetic, or semiconductor system, apparatus, device, or network. Note that the computer usable or computer readable medium could even be paper or another suitable medium upon which the program is printed, as the program can then be electronically captured from the paper and then compiled, interpreted, or otherwise processed in a suitable manner.

Specific embodiments of an invention are described herein. One of ordinary skill in the computing and financial arts will recognize that the invention can be applied in other environments and in other ways. It should also be understood that an implementation of the invention can include features and elements or steps in addition to those described and claimed herein. Thus, the following claims are not intended to limit the scope of the invention to the specific embodiments described herein.

What is claimed is:

1. A computer-implemented method of generating a recommendation as to whether to file for relief from bankruptcy relative to an account and collateral associated with the account, the method comprising:
   receiving data associated with the account via a computer;
   determining a cycle time for discharge of the bankruptcy based on the received data;
   determining an estimate of a monetary amount of depreciation saved based at least in part on a depreciation rate for the collateral, the cycle time, and a predicted time for obtaining relief from the bankruptcy;
   comparing the monetary amount of depreciation saved to a cost for obtaining relief; and
   producing, via the computer, the recommendation for the account.

2. The computer-implemented method of claim 1 wherein the determining of the cycle time further comprises calculating an outside discharge time based on a historical average discharge time and a standard deviation for bankruptcy filings for a specified court wherein the bankruptcy is pending.

3. The computer-implemented method of claim 2 wherein the estimating of the monetary amount of depreciation further comprises:
    calculating the depreciation rate;
    determining an estimate of a number of days of depreciation based at least in part on the predicted time for obtaining relief from bankruptcy, a current date, and a filing date for the bankruptcy; and
    multiplying a difference between the outside discharge time and the number of days of depreciation by the depreciation rate.

4. The computer-implemented method of claim 1 further comprising generating filing documents for use in obtaining relief from the bankruptcy when the recommendation is positive.

5. The computer-implemented method of claim 2 further comprising generating filing documents for use in obtaining relief from the bankruptcy when the recommendation is positive.

6. The computer-implemented method of claim 3 further comprising generating filing documents for use in obtaining relief from the bankruptcy when the recommendation is positive.

7. A computer program product for generating a recommendation as to whether to file for relief from bankruptcy relative to an account and collateral associated with the account, the computer program product including a storage medium with computer program code thereon, the computer program code comprising:
    executable instructions configured to determine a cycle time for discharge of the bankruptcy;
    executable instructions configured to determine an estimate of a monetary amount of depreciation saved based at least in part on a depreciation rate for the collateral, the possible cycle time, and a predicted time for obtaining relief from the bankruptcy; and
    executable instructions configured to compare the monetary amount of depreciation saved to a cost for obtaining relief to produce the recommendation for the account.

8. The computer program product of claim 7 wherein the executable instructions for determining a cycle time further comprise executable instructions configured to calculate an outside discharge time based on a historical average discharge time and a standard deviation for bankruptcy filings for a specified court wherein the bankruptcy is pending.

9. The computer program product of claim 8 wherein the executable instructions configured to determine an estimate of a monetary amount of depreciation further comprise:
    executable instructions configured to calculate the depreciation rate;
    executable instructions configured to determine an estimate of a number of days of depreciation based at least in part on the predicted time for obtaining relief from bankruptcy, a current date, and a filing date for the bankruptcy; and
    executable instructions configured to multiply a difference between the outside discharge time and the number of days of depreciation by the depreciation rate.

10. The computer program product of claim 7 further comprising instructions for generating filing documents for use in obtaining relief from the bankruptcy.

11. The computer program product of claim 8 further comprising instructions for generating filing documents for use in obtaining relief from the bankruptcy.

12. The computer program product of claim 9 further comprising instructions for generating filing documents for use in obtaining relief from the bankruptcy.

13. Apparatus for generating a recommendation as to whether to file for relief from bankruptcy relative to an account and collateral associated with the account, the apparatus comprising:
    means for determining a cycle time for discharge of the bankruptcy;
    means for determining an estimate of a monetary amount of depreciation saved based at least in part on a depreciation rate for the collateral, the cycle time, and a time for obtaining relief from the bankruptcy; and
    means for comparing the monetary amount of depreciation saved to a cost for obtaining relief; and
    means for producing the recommendation for the account.

14. The apparatus of claim 13 further comprising means for generating filing documents for use in obtaining relief from the bankruptcy.

15. A system for generating a recommendation as to whether to file for relief from bankruptcy relative to an account and collateral associated with the account, the system comprising:
    an instruction execution platform operable to:
        determine a cycle time for discharge of the bankruptcy, and
        determine an estimate of a monetary amount of depreciation saved based on a depreciation rate, the cycle time, and a predicted time for obtaining relief from the bankruptcy,
        compare the monetary amount of depreciation saved to a cost for obtaining relief; and
        produce the recommendation for the account; and
    a data set of statistics related to historical average discharge times for bankruptcy courts, the data set being disposed to be accessed by the instruction execution platform.

16. The system of claim 15 wherein the data set comprises a spreadsheet including average discharge times and standard deviations.

17. The system of claim 15 wherein the data set is disposed in a local database and includes average discharge times and standard deviations.

18. The system of claim 15 wherein the data set is disposed in a remote database and includes average discharge times and standard deviations.

19. The system of claim 15 further comprising stored filing documents for use in obtaining relief from the bankruptcy, the stored filing documents disposed to be accessed by the instruction execution platform.

20. The system of claim 16 further comprising stored filing documents for use in obtaining relief from the bankruptcy, the stored filing documents disposed to be accessed by the instruction execution platform.

21. The system of claim 17 further comprising stored filing documents for use in obtaining relief from the bankruptcy, the stored filing documents disposed to be accessed by the instruction execution platform.

22. The system of claim 18 further comprising stored filing documents for use in obtaining relief from the bankruptcy, the stored filing documents disposed to be accessed by the instruction execution platform.

\* \* \* \* \*